(12) United States Patent
Avadhanam

(10) Patent No.: US 8,713,449 B2
(45) Date of Patent: Apr. 29, 2014

(54) TRANSFERRING DATA BY TOUCH BETWEEN TOUCH-SCREEN DEVICES

(75) Inventor: Phani Bhushan Avadhanam, San Diego, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 404 days.

(21) Appl. No.: 13/074,208

(22) Filed: Mar. 29, 2011

(65) Prior Publication Data

US 2012/0254746 A1 Oct. 4, 2012

(51) Int. Cl.
*G06F 3/00* (2006.01)
*G06F 3/033* (2013.01)

(52) U.S. Cl.
USPC ........... 715/748; 715/733; 715/741; 715/761; 715/863

(58) Field of Classification Search
None
See application file for complete search history.

(56) References Cited

U.S. PATENT DOCUMENTS

| 6,535,228 | B1* | 3/2003 | Bandaru et al. ............... 715/752 |
| 2004/0169675 | A1* | 9/2004 | Beck et al. ..................... 345/705 |
| 2006/0090122 | A1* | 4/2006 | Pyhalammi et al. ....... 715/500.1 |
| 2009/0006976 | A1* | 1/2009 | Im ................................. 715/738 |
| 2010/0325557 | A1* | 12/2010 | Sibillo .......................... 715/751 |
| 2011/0055773 | A1* | 3/2011 | Agarawala et al. ........... 715/863 |
| 2012/0210275 | A1* | 8/2012 | Park et al. ..................... 715/810 |

* cited by examiner

*Primary Examiner* — Stephen Alvesteffer
(74) *Attorney, Agent, or Firm* — Neugeboren O'Dowd PC

(57) ABSTRACT

A very intuitive and simple set of touch-screen input steps along with the processing of those input steps allows a user to appear to gather shareable files with his fingers on one touch-screen apparatus, lift the files from the touch-screen and drop the shareable files on a touch screen of a second, co-located touch-screen apparatus. The touch-screen apparatus initiating the transfer of files is preset with sharing parameters to manage the transfer of files to a local or remote server. One or more touch-screen apparatus accepting the transfer of files is preset with acceptance parameters to manage the transfer of files from the server to the accepting touch-screen apparatus. Once the files are at the server, multiple touch-screen apparatus may be used to request shareable files from the server.

9 Claims, 5 Drawing Sheets

TRANSFERRING DATA BY TOUCH BETWEEN TOUCH-SCREEN DEVICES

FIELD OF THE INVENTION

This invention relates to touch-screen computing devices. More particularly it relates to moving files from a first touch-screen computing device to one or more other computing devices.

BACKGROUND OF THE INVENTION

Touch-screen computing devices, such as smartphones (sometimes referred to as application phones) and tablet computers, have applications that create data files such as documents, spreadsheets, presentation slides, photos and many other types of data files. Often it is desirable for a user to be able to move such data files from one touch screen computing device to another touch screen computing device. For example, a user may wish to transfer photos, word or number processing documents, note files or drawing files from her tablet computer to her smartphone.

To execute the transfer files between touch-screen computing devices, the user might email the files. Alternatively the user might export and import the files using various protocols to send the files from one computing device to another. In either case, the user must follow an elaborate, multi-step process to transfer the files from the initiating touch-screen computing device initiating the transfer to the accepting touch-screen computing device accepting the transfer. In the past this has required multiple touch-screen input steps by the user to select files, create a transport mechanism, attach the data files to the mechanism and send the files.

It is with respect to these considerations and others that the present invention has been made.

SUMMARY OF THE INVENTION

In accordance with many embodiments, a very intuitive and simple set of touch-screen input steps along with the processing of those input steps allow a user to appear to gather shareable files with his fingers on one touch-screen computing device, lift the files from the touch-screen and drop the shareable files on a touch screen of a second, co-located touch-screen computing device. In one embodiment, the touch-screen computing device initiating the transfer of files is preset with sharing parameters to manage the transfer of files to a local or remote server. One or more touch-screen computing devices accepting the transfer of files is preset with acceptance parameters to manage the transfer of files from the server to the accepting touch-screen computing device. Once the files are at the server, multiple touch-screen computing devices may be used to request shareable files from the server. If the initiating and accepting touch-screen computing devices are not co-located, the transfer is accomplished by separate users executing a touch event to select files at the initiating touch-screen computing device and executing a touch event at the accepting touch-screen computing device.

Other embodiments relate to a touch-screen computing device for transferring shareable files from a touch-screen computing device. A selection module responsive to a touch event identifying selected files as shareable files by interpreting the touch sequence in the touch event. A connection module establishes a network connection and sends sharing parameters over the network connection to define the parameters for sharing the shareable files with other touch-screen computing devices. A file transfer module sends the sharable files according to sharing parameters to multiple touch-screen computing devices meeting the sharing parameters.

In accordance with still other aspects, embodiments of the present invention relate to a method for transferring shareable files from an initiating touch-screen computing device to one or more accepting touch-screen computing devices. The method begins by identifying selected files as shareable files from a touch event on the initiating system. The touch event includes a sequence of touches that are interpreted during the act of identifying the shareable files. After establishing a network connection to a server, sharing parameters are sent over the network connection to the server to define sharing parameters used for sharing the shareable files from the server to one or more accepting touch-screen computing devices. An act of transferring files sends the shareable files over the network connection to the server for subsequent transfer from the server to one or more accepting touch-screen computing devices meeting the sharing parameters. An act of establishing a network connection between an accepting touch-screen computing device and the server is followed by an act of sending acceptance parameters from the accepting touch-screen computing device over the network connection to the server to define the criteria for accepting the shareable files from the initiating touch-screen computing device. An act of transferring from the server the sharable files meeting the acceptance parameters downloads the files to the accepting touch-screen computing devices.

These and various other features as well as advantages, which characterize the present invention, will be apparent from a reading of the following detailed description and a review of the associated drawings.

DETAILED DESCRIPTION

Figure 1:
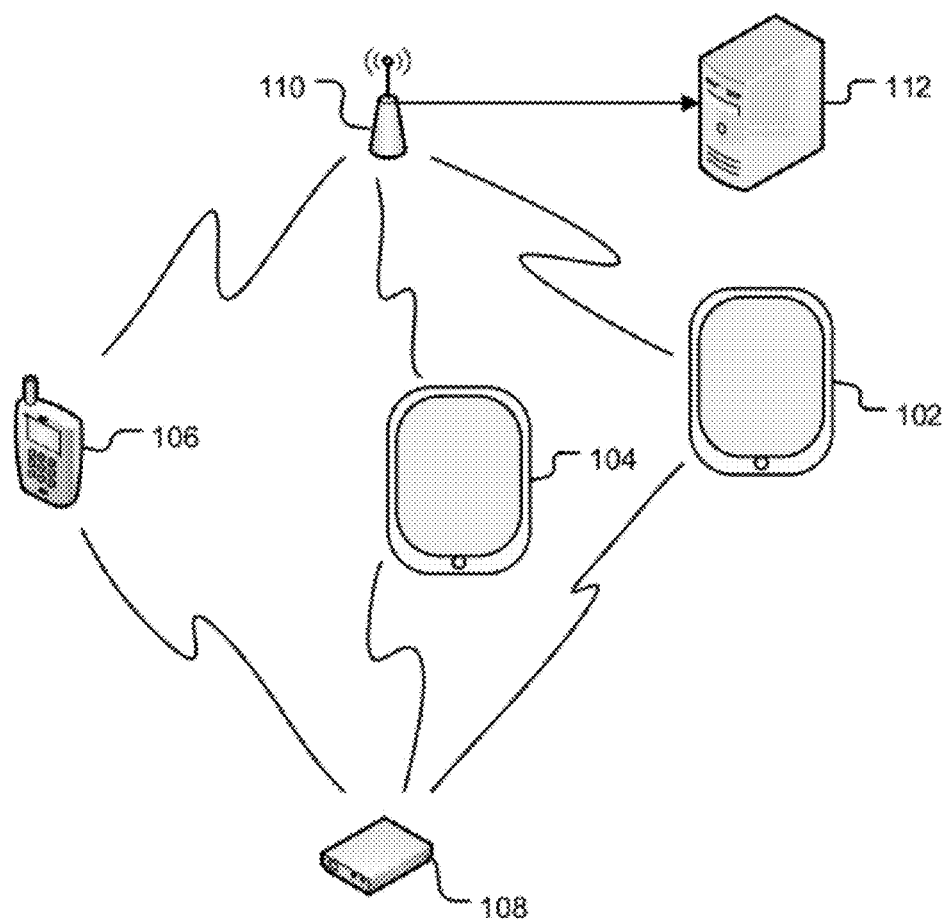
FIG. 1 illustrates two environments for multiple touch-screen computing devices transferring files amongst themselves in one environment through a co-located server or in another environment through a server in an operator network.

FIG. 1 illustrates two environments for multiple touch-screen computing devices transferring files in accordance with embodiments of the invention. Tablet computing devices 102 and 104 have a touch screen and one or more keys to input information and commands. Likewise, smartphone 106 has a touch screen and one or more keys to input information and commands. In addition the smartphone may have a built in numeric or QWERTY keyboard (not shown).

In a co-located environment, smartphone 106 and tablet computing devices 102 and 104 communicate with an intelligent storage system 108 using modems and a local network protocol such as the Bluetooth communication protocol. The intelligent storage system 108 operates as a local server with which touch-screen computing devices communicate to transfer files from a first touch-screen computing device to one or more of the other touch screen computing devices. For example, tablet computing device 104 may be an initiating computing device that transfers files to the intelligent storage system 108 that acts as a local server for the transfer. Smartphone 106 and/or tablet computing device 102 may then act as accepting computing devices by connecting with the intelligent storage system 108 to transfer the files from the intelligent storage system 108 to smartphone 106 and/or tablet computing device 102. In either case, the selection and transfer of files is accomplished with touch-screen input where the user in this co-located environment appears to use his fingers to lift the files from one touch-screen computing device and drop the files at a second touch-screen computing device.

In a second environment where the touch-screen computing devices are not co-located, the tablet computing devices 102 and 104 and smartphone 106 might all be sited at separate locations and communicating through a WIFI access point 110 to an operator network with a server 112. It will be appreciated by one skilled in the art that any number of wide area network configurations might be implemented to provide a connection using TCP/IP protocols between WIFI access point 110 through cellular towers (not shown) of the operator network with Ethernet connection to server 112. The server 112 works with the touch-screen computing devices to transfer files from a first touch-screen computing device to one or more of the other touch screen computing devices. For example, smartphone 106 might be the initiating touch-screen computing device and transfer files to server 112, and the tablet computing devices 102 and/or 104 may then act as accepting touch-screen computing devices by connecting with the server 112 to transfer the files from the server 112 to tablet computing device 102 and/or tablet computing device 104. In this environment where the touch-screen computing devices are not co-located, the user at the initiating computing device would use its touch-screen to select the files and initiate the transfer of files to the server 112. Another user at the location of an accepting computing device would then touch the screen of the accepting computing device to transfer the files from the server 112 to the accepting computing device. Of course if a time window for the transfer of file(s) is sufficient, the first user might move from the initiating computing device's location to the accepting computing device's location and provide touch input for both the initiating the transfer of file(s) to the server 112 and the accepting the transfer of file(s) from the server.

Figure 2:
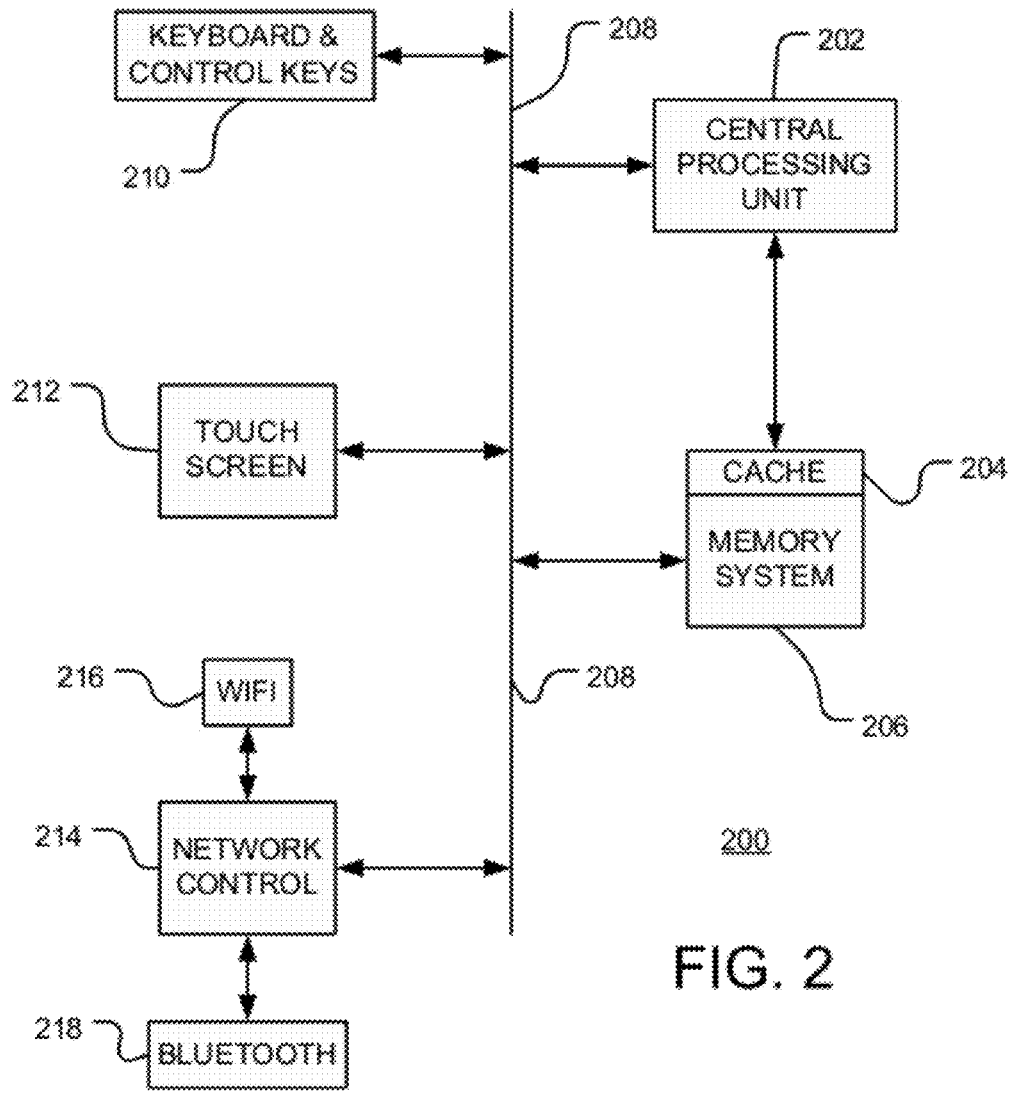
FIG. 2 shows a typical computing device for implementing any of the touch-screen computing devices of FIG. 1.

FIG. 2 is an exemplary computing device 200 representative of any type of touch-screen computing device such as a smart phone, or tablet computing devices. Central processing unit (CPU) 202 is the main processing unit executing computer processes. The CPU 202 works with cache memory 204 in memory system 206 as well as program storage, file storage and working storage also contained in memory system 206. The cache memory 204 is usually directly linked to CPU 202, while remaining storage in the memory system 206 may be accessed through bus 208.

A keyboard and/or control keys 210 are one type of input available to CPU 202 through bus 208. Another input device is touch screen 212, which serves as both an output device displaying information to a user and an input device receiving input from the user through the touch screen 212. As shown, the touch screen 212 is connected to the CPU 202 over the bus 208.

The network control module 214 connects to the CPU 202 to perform network control operations to connect the computing device 200 to a wireless network via WIFI modem 216 or Bluetooth modem 218. The Network control module 214 may be an intelligent module with its own computing device and memory including a cache. Alternatively, it may be implemented as firmware or software running on the CPU 202. Likewise the keyboard and/or control keys 210, touch screen 212, and memory system 206 may all be intelligent subsystems communicating over the bus 208. One skilled in the art is well aware of the many variations possible in the design of a computing device performing the logical operations of the various embodiments of the present invention.

A computing device, such as computing device 200, typically includes at least some form of computer-readable media. Computer readable media can be any available media that can be accessed by the computing device 200. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

The logical operations of the various embodiments of the present invention are implemented (1) as a sequence of computer implemented acts or program modules running on a computing device and/or (2) as interconnected machine logic circuits or circuit modules within the computing device. The implementation is a matter of choice dependent on the performance requirements of the computing device implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 3:
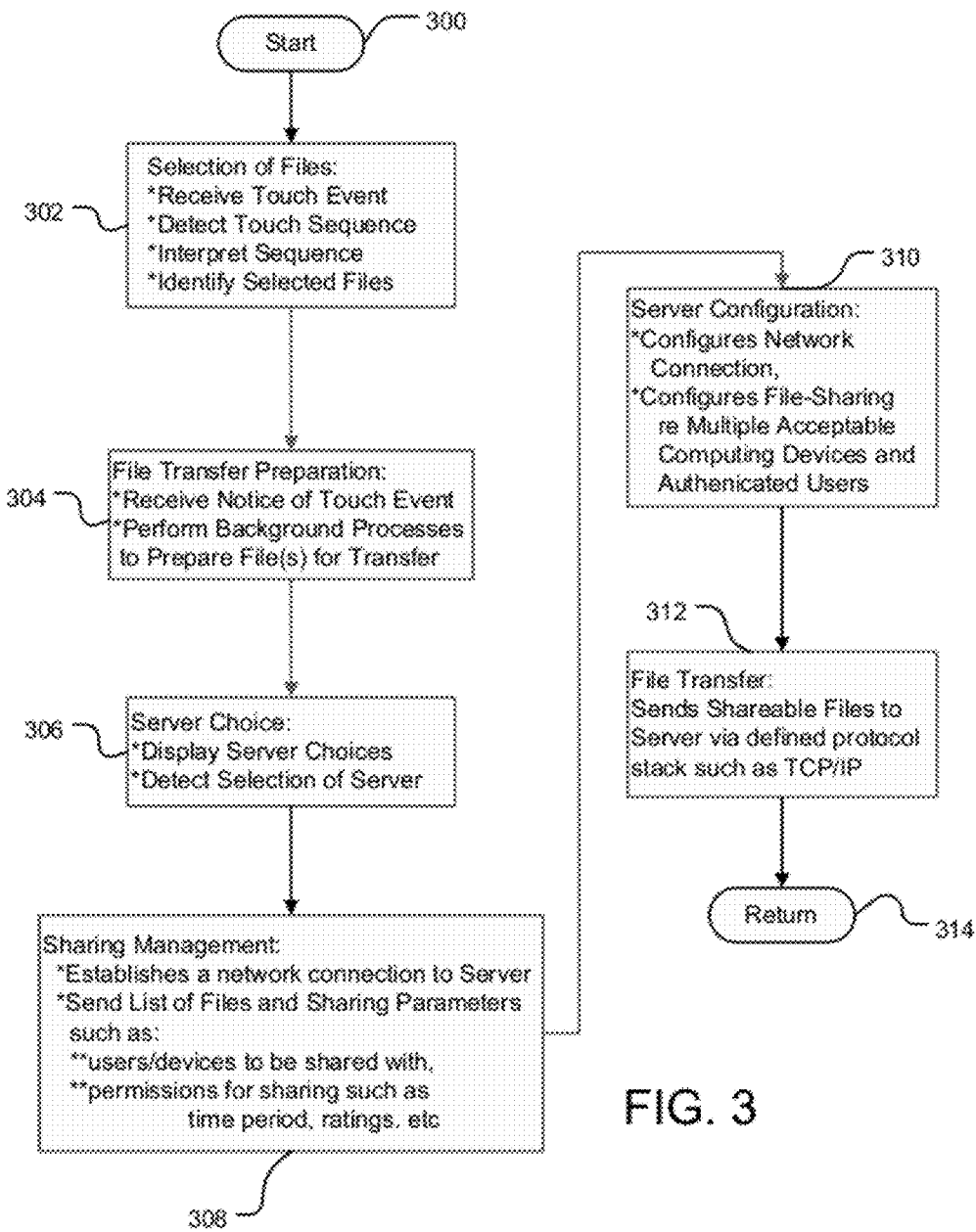
FIG. 3 shows a flow of operations performed at a first touch-screen computing device initiating a transfer of files.

FIG. 3 illustrates the flow of operations performed at a touch-screen computing device (e.g., the smartphone 106 or one of the tablet computing devices 102 and 104) initiating the transfer of files to another touch-screen computing device by first transferring files to a server (e.g., the server 112 or the intelligent storage system 108 that acts as a local server). In one embodiment, initial transfer operations are performed at the application layer running on an operating system in the touch screen computing device. The operation flow at start 300 is triggered by a touch event by a user at a first touch-screen computing device initiating the transfer of files. The selection module 302 receives the touch event and identifies selected files to be transferred as shareable files.

In one embodiment the touch event is a sequence of touches where a first touch is on a first file icon or listing displayed on a touch screen. A second touch is on a second file icon or listing on the screen, and a third touch is a sweeping touch from the second touch to the first touch to select all files in a set files located on the screen between the first file icon and the second file icon.

Figure 5:
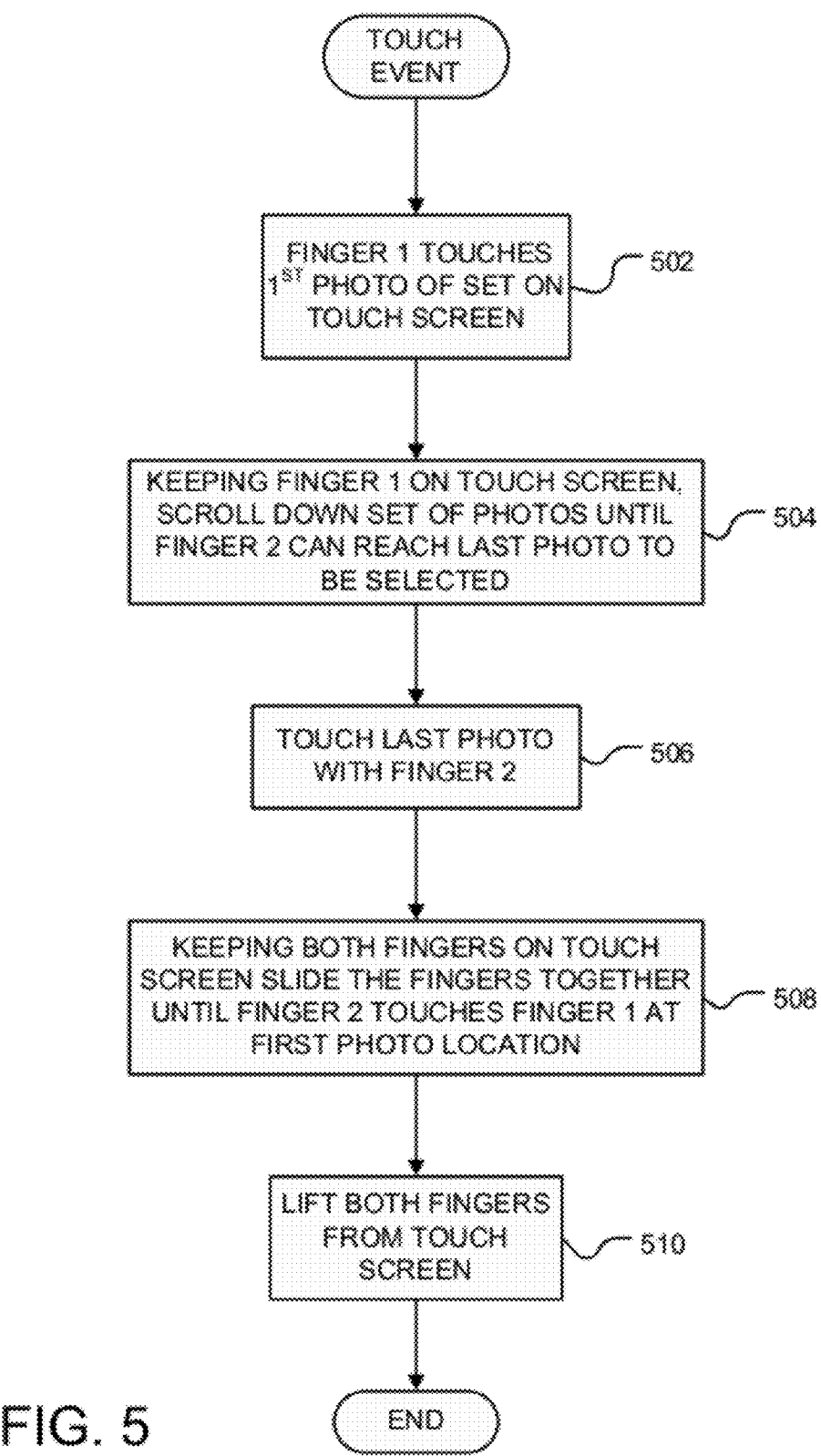
FIG. 5 shows one exemplary touch sequence for a touch event detected by the selection module of FIG. 3.

For example, the files might be photos displayed in a gallery on the touch screen. FIG. 5 shows an exemplary touch sequence for a touch event selecting a set of photos from a displayed photo gallery. The user would touch the first photo in a set with a first finger, i.e. a first touch 502. Leaving his finger on the screen on the first photo, he would scroll, i.e., touch 504, through the gallery until his second finger can touch the last photo selected from the gallery, i.e., the third touch 506. The user would then sweep the second finger across the screen toward the first finger to reach the first photo and touch the first finger as if he were gathering up the photos in the selected set, i.e. the fourth touch 508. Lastly, the sequences of touches in this touch event ends by the user lifting the first finger and thumb off the screen, i.e., a fifth touch 510, as if he were lifting the selected set of shareable photos from the touch screen.

In another embodiment the touch sequence for the touch event might be the user sequentially touching multiple file icons on the touch screen, which may or may not be contiguous file icons. For example, the user may select photos from photo icons on the screen by touching a first photo icon, lifting her touch finger, touching a second photo icon, lifting her touch finger and continuing in this manner to compile a set of selected photos as shareable photos. The closing of this touch event may be signaled by the user touching a "done" icon on the screen or by simply timing out a preset interval that expires when there are no further touches. A touch event may simply be a single touch selecting a single file icon or single file listing.

Referring again to FIG. 3, selection module 302 detects the touch sequence and interprets that touch sequence as indicating a single file, a set of sequential files, or a compiled set of non-sequential files. The selection module 302 also identifies the files from the touch location on the screen in the well-known manner and from the touch sequence.

In the exemplary embodiment, a transfer preparation operation 304 processes the touch event information at a background-service-protocol engine running at an application interface layer. This protocol engine may be implemented as a touch-event driver separate from the application layer and running on top of the operating system of the touch-screen computing device. In this implementation, the transfer preparation operation 304 receives notification of the touch event at the touch-event driver and receives information about selected files identified by selection module 302 as sharable files. The transfer preparation operation 304 also performs background processes on valid shareable files preparing for the transfer of those files to a server (e.g., the server 112).

As shown, a server choice operation 306 queries the user to select a server for use in the transfer of the files, and the server choice operation 306 displays the server choices available for the transfer. The user may then select a preferred server, such as local server or operator network server, by touching a selection on the touch screen. The server choice operation 306 receives the server selection and then sends it to the touch-event driver.

A sharing management module 308 in this embodiment establishes a network connection to the server selected by the user. The network connection is established using any of the transport protocols available on the user's touch screen computing device such as TCP/IP, Bluetooth, etc. Depending upon the communication protocol, the connection may be made with a handshake conversation between the touch-screen computing device and the server, or the connection may simply be made as a one-way connection protocol with an open-connection notification to the server. In either case, the communication to establish the connection will include connection configuration information. Once the connection is made, the sharing management module 308 sends to the server a list of shareable files to be transferred and all of the sharing parameters for the shareable files. The sharing parameters sent by the sharing management module 308 comprise identifiers for the users or computing devices that files are to be shared with, the permissions for sharing such as a time period for sharing, ratings, and other criteria for sharing, and any other parameters set up by the user initiating the transfer. The sharing parameters may be preset in a settings file as general sharing parameters but can be managed by the user to adjust for specific situations.

As shown in FIG. 3, a configuration module 310 in this embodiment is implemented at a server selected by the user (e.g., the server 112 or the intelligent storage system 108 that acts as a local server), and the configuration module configures the server to receive the sharing parameters and the files, and the configuration module 310 configures the network connection per the configuration information sent by the sharing management module 308. Configuration information might include packet size, protocol for processing packets, etc. The configuration module 310 also processes sharing parameters indicating files shareable to permitted touch-screen computing devices (e.g., smartphones and/or tablet computing devices identified as shareable devices). Alternatively, the configuration module 310 may set up the server to share files with authenticated users at any touch-screen device. Thus, the configuration module 310 sets up the server to receive file transfer requests from an initiating touch-screen computing device and one or more accepting touch-screen computing devices. The configuration module 310 may also set up a maximum number of requests that can be handled at a given time. Further, based on the parameters from the initiating touch-screen computing device, the configuration module 310 may set the period of time any file may be requested from the server by an accepting touch-screen computing device.

As shown, a file transfer operation 312, which may be carried out by a corresponding file transfer module (e.g., a code module residing the memory system 206 that is executable by the CPU 202) sends the shareable files from the initiating touch-screen computing device to the server. The files are sent using the appropriate defined protocol stack. For example, if a server (e.g., the server 112) in an operator network is receiving the shareable files, a TCP/IP stack is used. For a co-located server (e.g., the intelligent storage system 108 acting as a local server), the protocol might be Bluetooth. After the transfer operation is complete, the operation flow returns at termination 314 to the operating system of the initiating touch-screen computing device.

Figure 4:
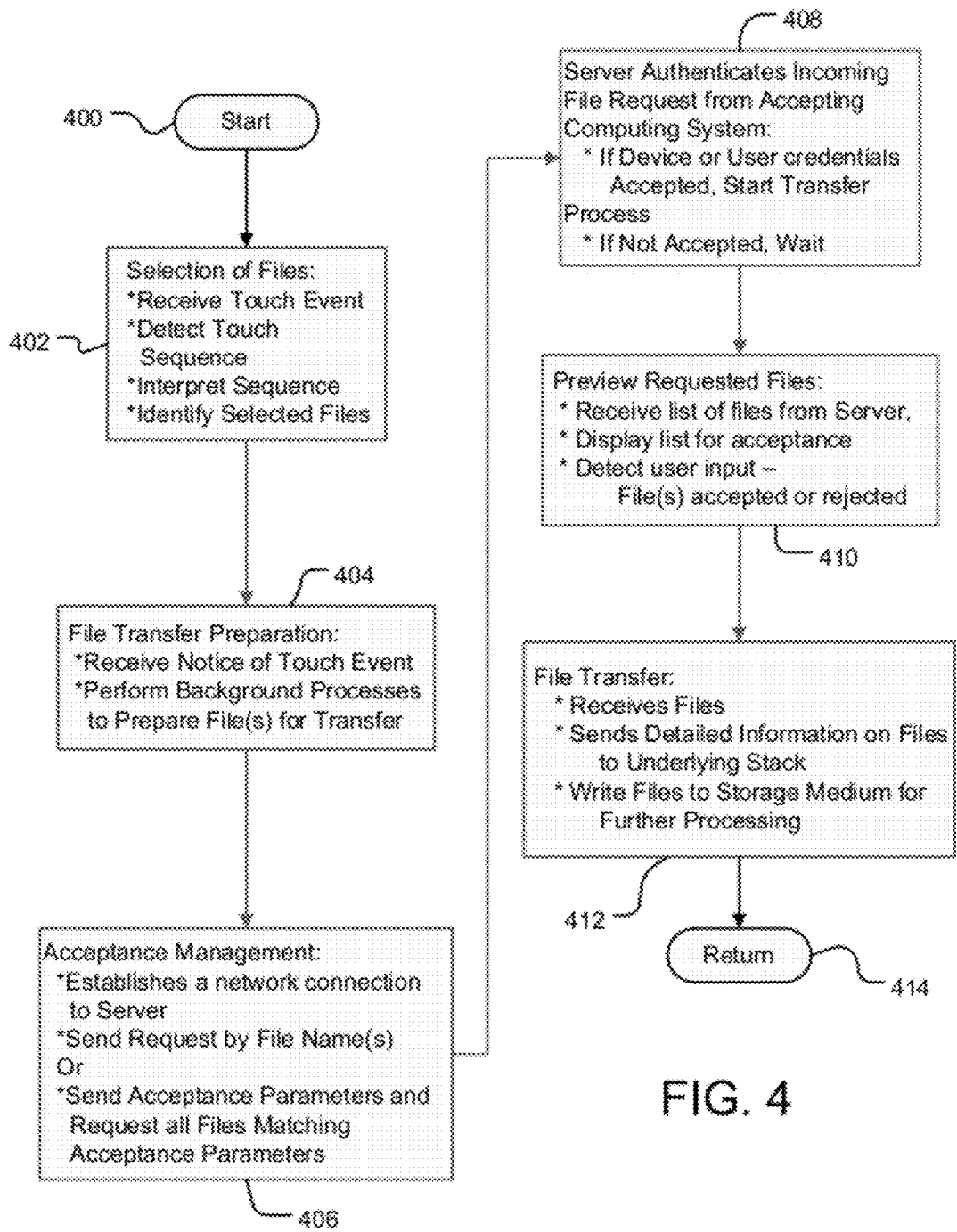
FIG. 4 illustrates a flow of operations performed at one or more touch-screen computing devices accepting the transfer of files from the first touch-screen computing device.

FIG. 4 illustrates the flow of operations performed at a touch-screen computing device (e.g., the smartphone 106 or one of the tablet computing devices 102 and 104) accepting the transfer of shareable files from a server (e.g., the server 112 or the intelligent storage system 108 that acts as a local server). In many modes of operation, a user invokes an application for accepting the shareable files and performs a touch event to select the shareable files to be transferred from the server. In one embodiment for example, initial transfer operations to accept files are performed at the application layer running on an operating system in the accepting touch-screen computing device (e.g., the smartphone 106 or one of the tablet computing devices 102 and 104). As shown, the operation flow beginning at start 400 is triggered by a touch event performed by a user at an accepting touch-screen computing device choosing to accept the transfer of files. A selection module 402 then receives the touch event that identifies shareable files selected to be transferred from the server to the accepting touch-screen computing device.

In one embodiment, the touch event is a single touch where the application invoked by the user displays a choice to (1) accept all shareable files, (2) preview a list of shareable files, or (3) set acceptance parameters for accepting shareable files. If the user elects to "accept" all files, the touch event is completed. If user elects to "preview" a list, the list of shareable files is displayed, and the user then sequentially touches multiple file icons on the touch screen to compile a selected set of shareable files to be accepted. The closing of this touch event might be signaled by the user touching a "done" icon on the screen or by simply timing out a preset interval that expires when there are no further touches. If the user elects to "set parameters" for accepting shareable files, the user is prompted to select acceptance parameters. Acceptance parameters may be all shareable files posted on the server in the last hour, last day, or within a data range, or shareable files of a particular file type or having a particular rating etc.

As shown, the selection module 402 in this embodiment detects the touch sequence and interprets whether that touch sequence indicates that a selection was made to accept of all shareable files, to accept a compiled set of the shareable files, or to accept shareable files satisfying one or more acceptance parameters. The selection module 402 specifies shareable files to be accepted by name or by acceptance parameter based on the touch location on the screen and on the touch sequence.

As shown, a transfer preparation operation 404 analyzes the touch event information (e.g., at a background-service-protocol engine running at an application interface layer). This protocol engine may include touch-event driver described with reference to FIG. 3 that operates separately from the application layer and runs on top of the operating system of the touch-screen computing device. The transfer preparation operation 404 also receives notification of the touch event at the touch-event driver and receives metadata about shareable files to be accepted as specified by selection module 402. In addition, the transfer preparation operation 404 performs background processes preparing for the transfer of those files from the server.

In this embodiment, an acceptance management module 406 establishes a network connection to the server. The network connection is established using any of the transport protocols available on the accepting touch-screen computing device such as TCP/IP, Bluetooth, etc. Depending upon the communication protocol, the connection may be made with a handshake conversation between the touch-screen computing device and the server, or the connection may simply be made as a one-way connection protocol with an open-connection notification to the server. When the connection is made, the acceptance management module 406 requests shareable files from the server as selected by the selection module. If the shareable files were selected by name (icon), the acceptance management module 406 simply sends a file request by name. If the shareable files were specified by acceptance criteria, acceptance management module 406 sends a query requesting all shareable files that match the all of the acceptance parameters. The acceptance parameters might specify the users or computing devices, the permissions for sharing such as time period, ratings, type of file, location of initiating computing device, subject matter and other criteria for criteria for acceptance set up by the user accepting the transfer of shareable files. The acceptance parameters are preset in a settings file as general acceptance parameters but can be managed by the user to adjust for specific situations The authentication operation 408 is performed at a server (e.g., the server 112 or the intelligent storage system 108 that acts as a local server) and it validates the incoming file request for the accepting touch-screen computing device. If the accepting touch-screen computing device making the file request matches an accepting touch-screen computing device specified by the initiating touch-screen computing device, the credentials of the system are accepted and the transfer process for requested files from server to accepting computing device begins. Likewise, if the file request comes from a user, the server will require the user to be authenticated, for example, by login credentials. Again, if the user credentials match those specified by the initiating touch-screen computing device, the login will be accepted and the server starts the transfer process of requested files to the accepting touch-screen computing device where the user logged in.

As depicted, a preview module 410 allows the user to preview a list of files from the server received at the accepting touch-screen computing device. This preview is particularly valuable if the user has not previously reviewed a list of shareable files as detected by the selection module 402. The user at the accepting touch-screen computing device may have elected to accept all shareable files or only those shareable files that meet acceptance parameters. In either case, the user will not have seen a list of shareable files until the list is received and displayed by the preview module 410. The user at the accepting computing device may now review the list and either accept or reject each shareable file on the list. Alternatively, the user may touch an icon on the touch-screen to accept all or reject all of the files in the displayed list.

A file transfer operation 412 in this embodiment may operate at the application layer on the accepting touch-screen computing device to download and store the shareable files marked "accepted" during the operational flow at preview module 410. The shareable files received from the server are written to a storage medium at the accepting touch-screen computing device. The storage medium may be internal or external if the touch-screen storage system can attach to external storage medium devices. The file transfer operation 412 also sends detailed information on the received files to the underlying protocol stack, and once the files are downloaded into storage, they are available for further processing by applications on the accepting touch-screen computing device. After the file transfer operation 412 is complete, the operation flow returns at termination connector 414 to the operating system of the accepting touch-screen computing device.

While the operational flow for one accepting touch-screen computing device has been described, it should be recognized that multiple accepting touch-screen computing devices may interact with the server to select and download shareable files as described above.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method for transferring shareable files from an initiating apparatus to one or more accepting touch-screen apparatus, said method comprising:
    detecting a user motion of two or more fingers on a touch-screen of the initiating apparatus identifying selected files as shareable files;
    establishing a network connection:
    sending sharing parameters over the network connection to a server to provide the server with the sharing parameters, the sharing parameters defining how the shareable files may be shared with other touch-screen apparatus; and
    transferring the sharable files to the server to enable the server to send the shareable files to other touch-screen apparatus that meet the sharing parameters;
    detecting a touch event involving two or more fingers on one of the one or more accepting touch-screen apparatus; and
    transferring the sharable files from the server to the one of the one or more accepting touch-screen apparatus,
    wherein the sharing parameters include a time period for detecting the touch event on the one or more accepting touch-screen apparatus.

2. The method of claim 1 wherein identifying includes:
    interpreting the user motion of two or more fingers to identify the selected files as the shareable files.

3. The method of claim 1 wherein the sharing parameters also include a proximity between the initiating apparatus and the accepting touch-screen apparatus.

4. The method of claim 1, wherein transferring the sharable files includes:
    sending the shareable files over the network connection to the server for subsequent transfer from the server, the server is selected from the group consisting of a local server and a remote server.

5. The method of claim 4 further comprising:
    displaying multiple server choices on the touch-screen; and
    detecting a server-choice touch-event to identify the server.

6. A non-transitory, tangible computer readable storage medium, encoded with processor readable instructions to perform a method for transferring shareable files from a touch-screen device, the method comprising:
    identifying selected files as shareable files from detection of two or more fingers moving toward each other on, and then being removed from, the touch-screen device;
    establishing a network connection;
    sending sharing parameters over the network connection to a server to provide the server with the sharing parameters, the sharing parameters defining how the shareable files may be shared with other touch-screen apparatus; and
    transferring the sharable files to the server to enable the server to send the shareable files to other touch-screen apparatus that meet the sharing parameters;
    detecting a touch event involving two or more fingers on one of the other touch-screen apparatus that meets the sharing parameters; and
    transferring the sharable files from the server to the one of the other touch-screen apparatus that meets the sharing parameters,
    wherein the sharing parameters include a time period for detecting the touch event on the one of the other touch-screen apparatus that meets the sharing parameters.

7. The non-transitory, tangible computer readable storage medium, of claim 6, wherein identifying the selected files includes:
    interpreting the detection of the two or more fingers moving toward each other to identify selected files as the shareable files.

8. The non-transitory, tangible computer readable storage medium, of claim 7 wherein the sharing parameters comprise (1) identifiers for touch-screen apparatus that can share the shareable files and (2) permissions for sharing the shareable files, wherein the permissions include a time period for requesting shareable files, ratings of shareable files, and file types of shareable files.

9. A method for transferring shareable files from an initiating touch-screen apparatus to one or more accepting touch-screen apparatus, said method comprising:
    detecting a user motion of two or more fingers on a touch-screen of the initiating touch-screen apparatus identifying selected files as shareable files;
    establishing a network connection;
    sending sharing parameters over the network connection to a server to provide the server with the sharing parameters, the sharing parameters defining how the shareable files may be shared with other touch-screen apparatus; and
    transferring the sharable files to the server to enable the server to send the shareable files to the accepting touch-screen apparatus, wherein the accepting touch-screen apparatus comprises an apparatus that meets the sharing parameters;
    detecting a touch event involving two or more fingers on a touch-screen of the accepting touch-screen apparatus; and
    transferring the sharable files from the server to the accepting touch-screen apparatus,
    wherein the sharing parameters include a time period for detecting the touch event on the accepting touch-screen apparatus and a proximity between the initiating touch-screen apparatus and the accepting touch-screen apparatus.

* * * * *